(12) United States Patent
Zimmerman

(10) Patent No.: US 9,506,797 B2
(45) Date of Patent: Nov. 29, 2016

(54) APPARATUS FOR ESTIMATING THE LEVEL OF FEED IN A BULK FEED TANK

(71) Applicant: H. Lamar Zimmerman, Manheim, PA (US)

(72) Inventor: H. Lamar Zimmerman, Manheim, PA (US)

( * ) Notice: Subject to any disclaimer, the term of this patent is extended or adjusted under 35 U.S.C. 154(b) by 91 days.

(21) Appl. No.: 14/703,026

(22) Filed: May 4, 2015

(65) Prior Publication Data

US 2015/0346012 A1 Dec. 3, 2015

Related U.S. Application Data

(60) Provisional application No. 62/004,112, filed on May 28, 2014.

(51) Int. Cl.
*G01F 23/296* (2006.01)
*G01F 23/00* (2006.01)

(52) U.S. Cl.
CPC ......... *G01F 23/296* (2013.01); *G01F 23/0015* (2013.01)

(58) Field of Classification Search
CPC ............. G01F 23/0015; G01F 23/282; G01F 23/296; G01F 23/2961; G01F 23/2966; G01F 23/2967; G01F 23/2968
USPC ................................ 73/290 B, 290 V, 290 R
See application file for complete search history.

(56) References Cited

U.S. PATENT DOCUMENTS

| 910,606 A * | 1/1909 | Swanson ................. G01F 19/00 73/290 R |
| 5,088,323 A * | 2/1992 | Johnson .............. G01F 23/0007 116/227 |
| 2015/0276463 A1* | 10/2015 | Milne ................. G01F 25/0061 73/19.1 |

FOREIGN PATENT DOCUMENTS

JP 07333037 A * 12/1995
JP 11248514 A * 9/1999

* cited by examiner

*Primary Examiner* — Peter Macchiarolo
*Assistant Examiner* — Nathaniel Kolb
(74) *Attorney, Agent, or Firm* — Miller Law Group, PLLC

(57) ABSTRACT

An apparatus for estimating the level of feed present within a bulk feed storage tank allows the empty volume of the storage tank above the level of feed to be estimated in order to evaluate the need to order new supplies of feed to be placed within the storage tank. The apparatus includes a slide mechanism having a slide block moveable within a vertically oriented slide tube. A rope entrained around a pulley is attached to the slide block to power movement of the slide block upwardly. A striker member is connected to the slide block and positioned externally of the slide tube. A second rope is attached to the striker member to permit selective actuation thereof to strike the exterior side of the storage tank. The pitch of the reverberation from the striking of the striker member provides an indication of the level of feed within the storage tank.

20 Claims, 3 Drawing Sheets

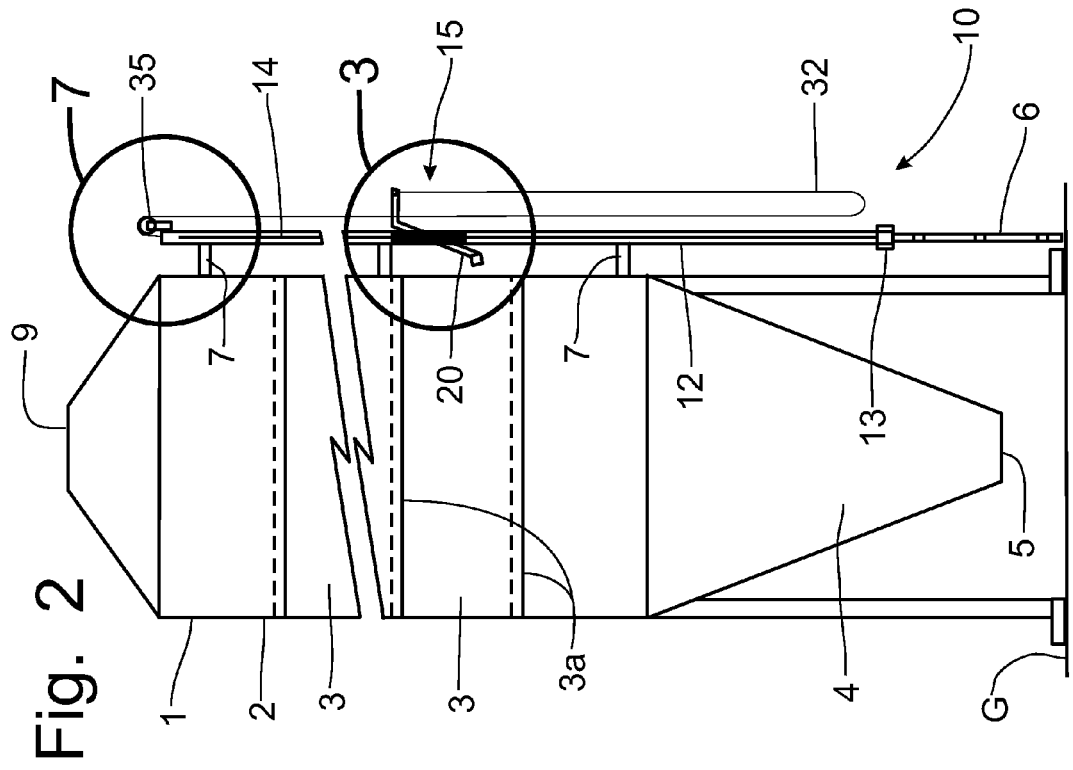
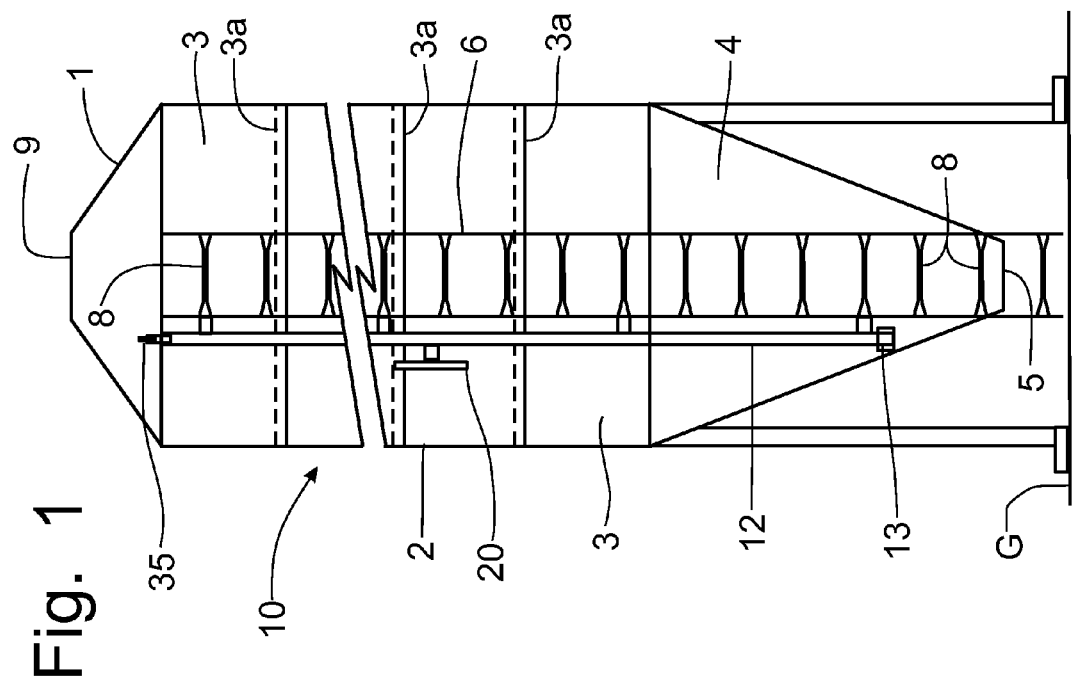

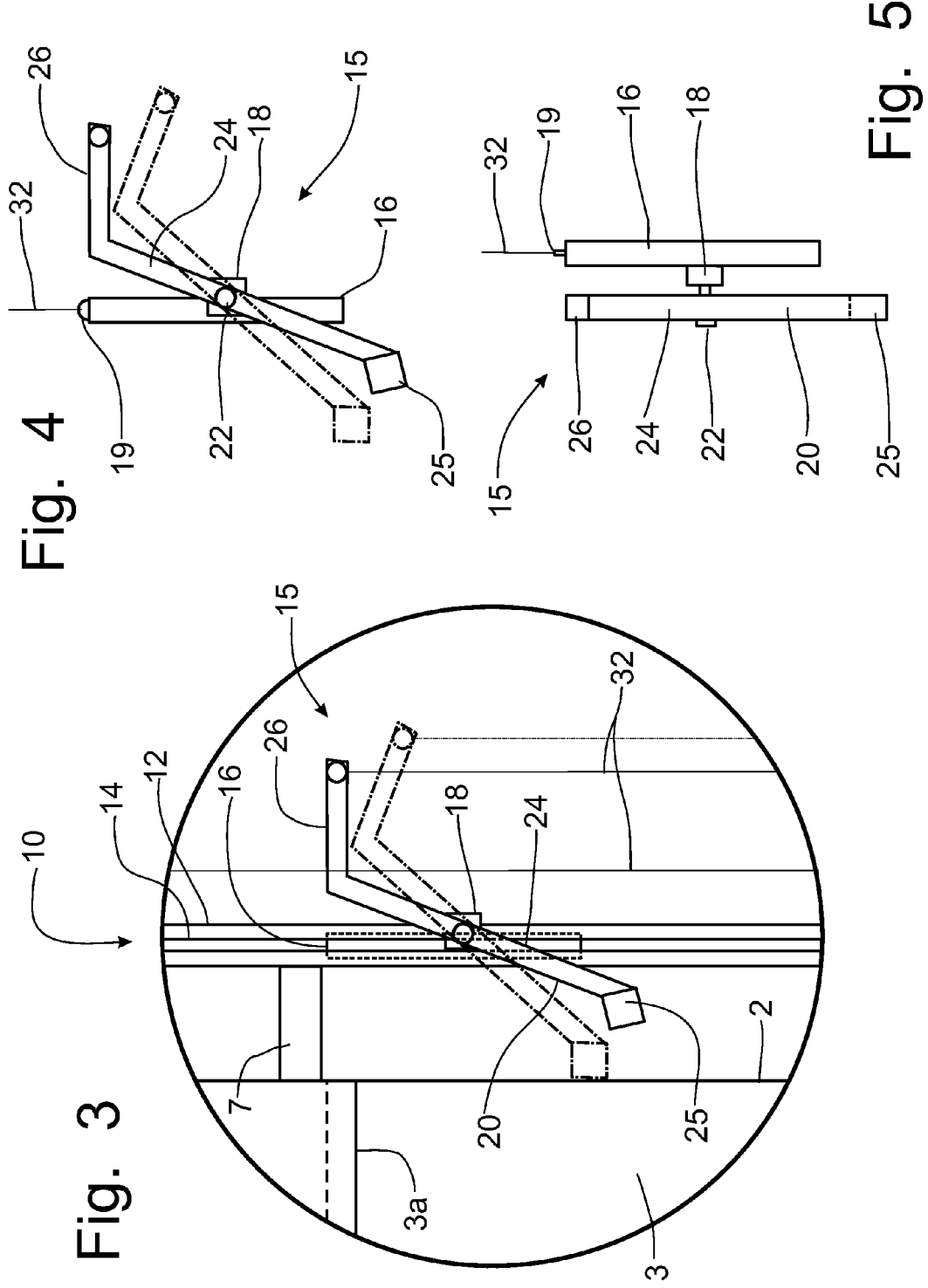

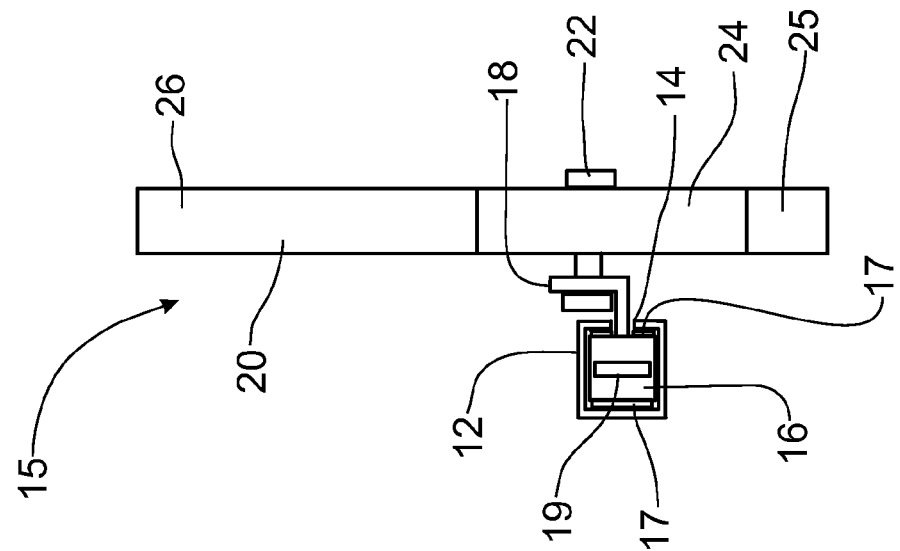
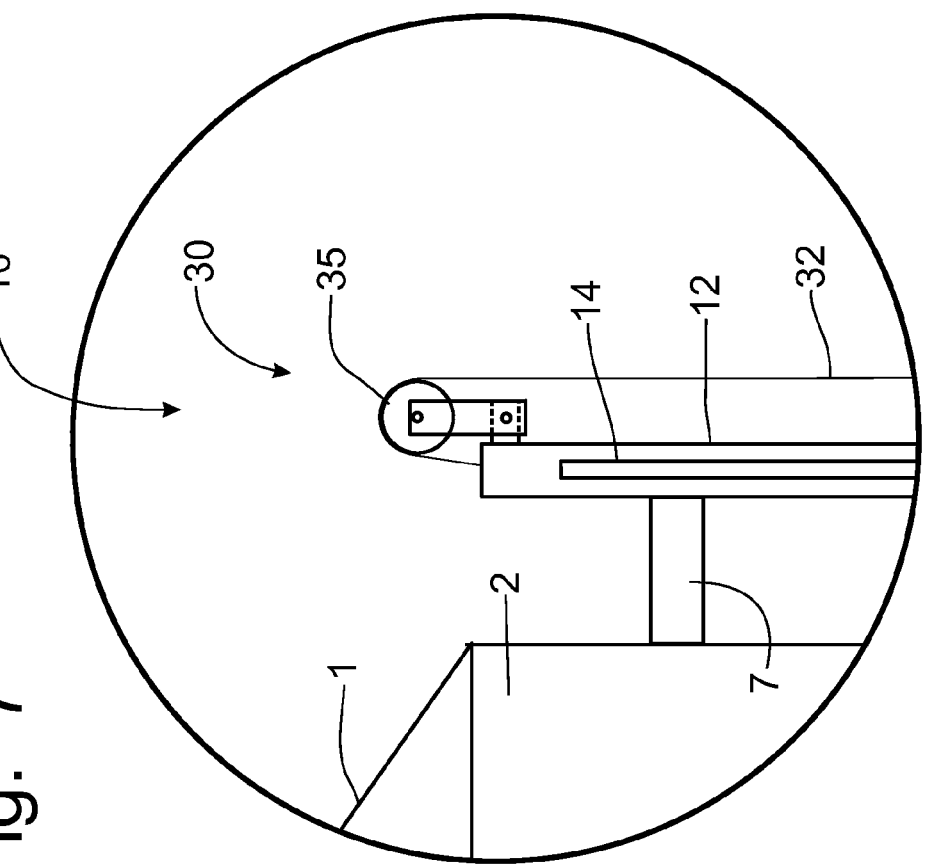

US 9,506,797 B2

APPARATUS FOR ESTIMATING THE LEVEL OF FEED IN A BULK FEED TANK

CROSS-REFERENCE TO RELATED APPLICATIONS

This application claims domestic priority to U.S. Provisional patent application Ser. No. 62/004,112, filed on May 28, 2014, the content of which is incorporated herein by reference.

FIELD OF THE INVENTION

This invention relates generally to a device for estimating the volume of feed in a bulk feed tank, and more particularly, to an apparatus movable along the vertical height of a bulk feed tank to impact the side of the bulk feed tank to estimate the level of feed within the tank from the sound made from the impact.

BACKGROUND OF THE INVENTION

Poultry houses are used to raise birds, such as chickens or turkeys, from a young age to an adult bird, at which time the adult birds are crated and delivered to a processing plant. Modern poultry houses can be provided with automated feeding devices that deliver food for the growing birds and with automated watering devices that provide fresh supplies of water as the water is consumed by the birds. Although other species of poultry are raised in such an environment, the most common specie is the chicken.

The feed for the chickens is stored outside of the chicken house in an upright container commonly referred to as a bulk feed tank, or a feed silo. These containers are usually round and formed of bands of corrugated galvanized steel sheeting formed into an arcuate shape and connected together to form a cylindrical tank. The top of the bulk feed tank includes an inlet opening into which a feed truck can deliver bulk supplies of feed for the birds into the tank. The feed flows to the bottom of the tank by gravity into a frusto-conical outlet portion that terminates in an outlet opening, which is typically coupled to the automatic feeding devices to supply feed to the poultry within the poultry house as is prearranged.

The bulk feed tanks vary in height and in diameter according to the volume of bulk feed that the operator wants to keep on hand. Differences in height can be attained by adding additional bands of galvanized sheet metal. The joints between the respective vertical bands of sheet metal provide dividing zones that can be used to calculate the amount of feed that the partially emptied feed tank can hold. For example, for a given diameter bulk feed tank, the volume of feed between the joints can be a given tonnage of feed, such as two tons of feed. Thus, if the bulk feed tank is emptied through two joints, the operator will know that he can order four tons of feed to be delivered to that particular bulk feed tank.

For purposes of inspection, bulk feed tanks typically include vertical ladders affixed to the side of the tank. The operator will typically climb the ladder and use a hammer or other solid object to impact the side of the tank as he climbs the ladder, periodically striking the tank as he climbs. The sound of reverberation made by the sheet metal bands is different when the bulk feed is behind the band of sheet metal than when the tank does not have feed behind the sheet metal panel being struck. The mass of the feed behind the panel deadens the reverberation, while the empty portion reverberates with more of an echo. In this manner, the operator can estimate with reasonable accuracy where the level of the feed inside the tank lies without climbing to the top of the tank and looking into the inlet opening.

Manufacturers of bulk feed tanks have addressed the problem of ascertaining the volume of feed remaining in the tank by forming transparent windows into the sides of the tank so that the operator can see where the level of the feed lies within the tank. However, transparent windows only work for a limited period of time because of the dirty and abrasive nature of poultry feed which clouds and scratches the interior side of the windows until the windows are no longer transparent and, thus, are no longer effective in determining where the level of feed lies within the tank.

It would be desirable to provide a device that can be utilized to ascertain the level of feed within the interior of a closed bulk feed tank without requiring the operator to physically climb a ladder on the tank to strike the sides of the tank with a solid object, or to inspect the interior of the tank through the inlet opening at the top of the tank.

SUMMARY OF THE INVENTION

It is an object of this invention to overcome the disadvantages of the known prior art by providing an apparatus for estimating the level of feed within a bulk feed tank without requiring a visual inspection of the contents of the bulk feed tank.

It is another object of this invention to provide an apparatus that enables a person to estimate the level of feed within a bulk feed storage tank without requiring the person to climb a ladder to access the interior of the bulk feed storage tank.

It is a feature of this invention that the person requiring the information as to the volume of feed remaining in the interior of a bulk feed storage tank can obtain that information by manipulating a rope at the ground level of the bulk feed storage tank.

It is an advantage of this invention that the empty volume of the bulk storage feed tank can be estimated.

It is another advantage of this invention that the timing for ordering a new supply of feed can be determined by utilizing the apparatus for estimating the level of feed in a bulk storage tank.

It is another feature of this invention that the apparatus for estimating the level of feed in a bulk feed storage tank includes a striker member supported on a slide block mounted in a slide tube secured relative to the side of the bulk feed storage tank.

It is still another advantage of this invention that the striker member can be moved vertically along the exterior surface of the bulk feed storage tank to permit the striker member to be operated at different vertically spaced positions along the slide tube.

It is still another feature of this invention that the movement of the slide block within the slide tube is controlled by a first rope entrained around a pulley at the top of the slide tube, while the movement of the striker member against the bulk feed storage tank is controlled through manipulation of a second rope accessible at the ground level adjacent the bulk feed storage tank.

It is yet another advantage of this invention that the reverberations of the exterior surface of the bulk feed storage tank have a different audible pitch when the striker member strikes the side of the storage tank with a supply of feed behind the exterior surface struck by the striker member, than when the side of the storage tank being struck by the striker member has nothing behind the exterior surface.

It is a further advantage of this invention that the operator can estimate the level of feed within the storage tank by listening to the change in pitch of the reverberations of the exterior surface of the bulk feed storage tank as the striker member is actuated to strike the exterior surface of the storage tank at different heights above the ground.

It is yet another feature of this invention that the slide mechanism is constructed to smoothly slide vertically within the slide tube with the striker member being supported in a cantilevered manner from the slide block.

It is a further feature of this invention that the slide block is movable within the vertical slide tube in an upward manner through manipulation of a rope and in a downward manner through the operation of gravity.

It is still another object of this invention to provide an apparatus for estimating the level of feed within a bulk feed storage tank that provides differently pitched reverberations when struck by a striker member depending on whether or not feed is located behind the position at which the striker member strikes the exterior side of the bulk feed storage tank, which apparatus is durable in construction, inexpensive of manufacture, carefree of maintenance, facile in assemblage, and simple and effective in use.

These and other objects, features and advantages are accomplished according to the instant invention by providing an apparatus for estimating the level of feed present within a bulk feed storage tank, which in turn estimates the empty volume of the storage tank above the level of feed in order to evaluate the need to order new supplies of feed to be placed within the storage tank. The apparatus includes a slide mechanism having a slide block moveable within a vertically oriented slide tube. A rope entrained around a pulley is attached to the slide block to power movement of the slide block upwardly. A striker member is connected to the slide block and positioned externally of the slide tube. A second rope is attached to the striker member to permit selective actuation thereof to strike the exterior side of the storage tank. The pitch of the reverberation from the striking of the striker member provides an indication of the level of feed within the storage tank.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a schematic front elevational view of a bulk feed tank having a ladder and an apparatus incorporating the principles of the instant invention to ascertain the level of feed within the interior of the tank;

FIG. 2 is a schematic side elevational view of the bulk feed tank shown in FIG. 1;

FIG. 3 is an enlarged schematic side elevational view of the apparatus for striking the sides of the bulk feed tank, the pivotal movement of the striking member being shown in phantom, corresponding to circle 3 in FIG. 2;

FIG. 4 is a schematic detail side elevational view of the striking apparatus removed from the slide tube, the pivotal movement of the striking member being shown in phantom;

FIG. 5 is a schematic detail front elevational view of the striking apparatus shown in FIG. 4;

FIG. 6 is an enlarged schematic cross-sectional view of the striking apparatus taken from above the striking apparatus within the slide tube; and FIG. 7 is an enlarged schematic side elevational view of the top portion of the slide tube, corresponding to circle 7 in FIG. 2.

DETAILED DESCRIPTION OF THE PREFERRED EMBODIMENT

Referring now to the drawings, the structural components of the apparatus 10 mounted on a bulk feed tank 1 can best be seen. Any references to left and right or up and down are used as a matter of convenience and are determined by standing at the front of the bulk feed tank, as depicted in FIG. 1, facing the ladder affixed to the side of the tank. One skilled in the art will understand that the principles of the instant invention are not limited to a feed tank for use in poultry raising operations, but would apply to any storage tank device having a vertical height, but since the preferred embodiment is a bulk feed tank used in chicken houses to store a supply of feed for the chickens, this is the embodiment shown in the drawings.

A conventional feed tank 1 is formed from metal panels 3 that are connected in a vertical orientation to one another at a joint 3a. Typically, the bulk feed tank 1 is formed as a cylindrical body portion 2 by the metal panels 3 and terminates in a frusto-conical outlet portion 4 having an outlet opening 5 at the end thereof to deliver feed into a feeding apparatus (not shown). Typically, the bulk feed tank 1 includes a ladder 6 mounted to the side of the bulk feed tank 1 by support brackets 7 so that an operator can climb the ladder 6 to reach the inlet opening 9 at the top of the bulk feed tank 1. The ladder 6 is vertically oriented and includes vertically spaced rungs 8 that enable access along the side of the bulk feed tank.

The apparatus 10 for estimating the level of feed within the interior of the bulk feed tank includes a vertically oriented slide tube 12 into which is formed a vertical slot 14 that extends from near the top portion to the bottom portion thereof. Preferably, for the sake of manufacture, transport and assembly, the slide tube 12 is formed in discreet segments that interconnect vertically to extend the slide tube 12 to the top of the cylindrical body portion 2 and downwardly therefrom to at least the bottom portion of the cylindrical body 2 or to within convenient reach of the ground G to facilitate any potential servicing of the slide apparatus 15 and striker member 20. For purposes of stability, the vertical slot 14 formed in the slide tube 12 preferably terminates below the top edge of the slide tube 12, but extends to the bottom edge of the slide tube 12 to facilitate assembly of the slide apparatus 15 into the slide tube 12. Preferably, a closing bracket 13 can fill the lower end of the slot 14 and stabilizes the lower end of the slide tube 12.

The slide tube 12 preferably mounts on the support brackets 7 of the ladder 6 along vertical length thereof. Alternatively, the slide tube 12 could mount directly to the side of the ladder 6, or be supported directly on the metal panels 3 forming the body 2 of the bulk feed tank 1. As is shown in FIG. 2, the slot 14 should be oriented to face away from the ladder 6 to permit a pivotal connection to the striker member 20, as will be described in greater detail below. The closing bracket 13 will also allow the slide apparatus 15 to rest on the bottom of the slide tube 12.

The slide apparatus 15 is preferably formed as a slide block 16 from a metal bar to provide sufficient weight as to move vertically downwardly through the slide tube 12 by gravity controlled by a rope mechanism 30, as will be discussed in greater detail below. The slide block 16 can include slide panels 17 mounted on the sides thereof to enhance the sliding movement of the slide block 16 through the slide tube 12. The slide panels 17 can be formed of low friction plastic material to reduce any friction between the slide block 16 and the interior surface of the slide tube 12. Preferably, the slide tube 12 is rectangular or square in shape and is formed from a metal or plastic hollow box. Alternatively, the slide tube could be round, also formed of metal or plastic tubing. The slide block 16 preferably has a cross-sectional shape that conforms to the selected shape of the slide tube 12 so that the slide tube 12 is substantially filled with the slide block 16.

The slide block 16 forms a first portion of the slide apparatus 15 that is retained within the slide tube 12 for vertical movement therewithin and also includes a second portion in the form of an L-shaped mounting flange 18 that is connected to the slide block 12 or welded thereto and projects outwardly from the slide block 16 through the slot 14 before bending at right angles to provide a mounting surface for the striker member 20. The L-shaped flange 18 supports a pivot 22 that connects the striker member 20 in a manner to allow the striker member 20 to strike the adjacent side of the body 2 of the bulk feed tank 1, as will be described in greater detail below. The slot 14 enables the L-shaped flange 18 to project from inside the slide tube 12 to a position outside the slide tube 12 and support the swinging movement of the striker member 20.

The striker member 20 includes an elongated body portion 24 that is connected to the L-shaped flange 18 through the pivot 22 in a manner to be pivotally movable relative to the slide apparatus 15. The lower end of the body 24 of the striker member 20 is preferably formed as a striker head 25 that is capable of striking the adjacent portion of the body 2 of the bulk feed tank 1 and cause a reverberation. The upper end of the body portion 24 bends at an angle to the body portion 24 to create an actuation handle 26 that provides some mechanical advantage for pivotally moving the striker member 20 to strike the adjacent metal panel with sufficient force to create a reverberation.

The movement of the slide block 16 is controlled through a mechanism 30 in the form of a rope 32 that connects to a mounting ring 19 at the top of the slide block 16 and extends upwardly therefrom within the interior of the slide tube 12 to exit the upper end of the slide tube 12. The rope 32 is then entrained around a pulley 35 mounted to the top end of the slide tube 12 and extends therefrom toward the ground G. Preferably, the rope 32 loops upwardly within convenient reach of an operator standing on the ground G and then extends upwardly to connect with the actuation handle 26 on the striker member 20. With the rope 32 configured in this manner, the operator can grasp the rope 32 near the lowermost loop and pull downwardly on the portion of the rope 32 extending downwardly from the pulley 35, which will cause the slide block 16 to move upwardly within the slide tube 12. As the rope 32 is pulled downwardly, the actuation handle 26 moves upwardly leaving the lowermost loop located within convenient reach of the operator. To secure the slide mechanism 15 at a selected vertical position within the slide tube 12, the lowermost portion of the slide tube 12 can be equipped with a tie-off (not shown) that locks the rope 32 at a selected position.

In operation, the slide tube 12 assembled and secured to vertically spaced supports, such as the ladder support brackets 7, so as to be oriented vertically in close proximity to the side of the bulk feed tank 1, yet far enough away to permit the pivotal movement of the striker member 20. The pulley 35 is affixed to the top of the slide tube 12 and the rope 32 is entrained around the pulley 35 with one end passing through the interior of the slide tube 12 and the other end positioned along the exterior of the slide tube 12. The slide apparatus 15 is pre-assembled with the striker member 20 pivotally connected to the L-shaped mounting flange 18 that projects from the slide block 16.

The end of the rope 32 passing through the interior of the slide tube 12 is secured to the mounting ring 19 at the top of the slide block 16 and the slide mechanism 15 is inserted into the bottom of the slide tube 12 with the L-shaped mounting flange 18 projecting through the slot 14. The closing bracket 13 can then be installed to maintain the gap in the slot 14 and to close the end of the slide tube 12 in a manner that prevents the slide mechanism 15 from falling out of the bottom of the slide tube 12. The second end of the rope 32 passing on the exterior of the slide tube 12 can be connected to the end of the actuation handle 26. If desired, the rope 32 can be tied off to secure the position of the slide mechanism 15 relative to the slide tube 12.

To check on the estimated level of the feed within the bulk feed tank 1, the operator pulls on the rope 32 to raise the slide mechanism 15 to a first selected position along the slide tube 12. While maintaining the position of the slide block 16 within the slide tube 12, the end of the rope 32 connected to the actuation handle 26 is pulled downwardly to cause the striker member 20 to pivot in a manner than moves the striker head 25 into a sharp engagement with the metal panel 3 adjacent to the slide mechanism 15. The operator listens to the reverberation in the bulk feed tank 1 caused by the striking of the metal panel 3 by the striker head 25. If the reverberation sounds deadened, the feed level within the bulk feed tank 1 is likely above the first selected position. If the reverberation sounds hollow, then the feed level is likely below the first selected position.

The slide mechanism 15 is then moved to a second selected position, either above or below the first selected position depending on the type of reverberation detected. The process of pivoting the striker member 20 is repeated and the operator again listens to the reverberation created. By positioning the slide mechanism 15 at different selected positions, the feed level in the bulk feed tank 1 can be reasonably accurately estimated. By judging the position of the estimated feed level relative to the joints 3a, the volume of the empty portion of the bulk feed tank 1 can be estimated and an appropriate amount of feed ordered to be placed into the bulk feed tank 1.

If the operator wants to leave the slide mechanism 15 at an elevated position within the slide tube 12, the rope 32 can be tied to a tie-off (not shown) or even tied to the ladder 6. The slide block 16 will move downwardly by gravity within the slide tube 16. The use of slide panels 17 will lower friction between the slide block 16 and the slide tube 12 to facilitate the downward movement of the slide block 16. Upward movement of the slide block 16 is manually effected by pulling appropriately on the rope 32. In the event the slide apparatus 15 needs to be serviced or replaced, the closing bracket 13 can be removed from the lower end of the slide tube 12 and the slide apparatus 15 extracted therefrom.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts,

Having thus described the invention, what is claimed is:

1. An apparatus for estimating a fill level of feed in a bulk feed tank, said bulk feed tank including a hollow body defining a storage compartment and being formed from metal panels oriented into a vertical structure, comprising:
   a slide tube supported in a vertical orientation along a vertical side of said bulk feed tank, said slide tube having a vertical slot formed therein;
   a slide apparatus having a first portion slidably received within said slide tube for vertical movement therein and a second portion projecting from said first portion through said slot;
   a striker member pivotally connected to said second portion and being selectively pivotally movable to strike an adjacent portion of said metal panels to create a reverberation sound; and
   a mechanism for selectively moving said slide apparatus relative to said slide tube and for selectively pivoting said striker member.

2. The apparatus of claim 1 wherein said slide apparatus includes a slide block positioned within said slide tube.

3. The apparatus of claim 2 wherein said slide block has slide panels mounted thereon to facilitate movement of said slide block within said slide tube.

4. The apparatus of claim 2 wherein said mechanism includes a rope secured to a top portion of said slide block, said rope being entrained around a pulley mounted at the top of said slide tube and extending downwardly therefrom to a position near a bottom portion of said slide tube, and then extending upwardly to connect to said striker member.

5. The apparatus of claim 2 wherein said second portion of said slide apparatus is a flange connected to said slide block and extending outwardly from said slide tube through said slot therein, said flange including a mounting portion to carry a pivot for connection to said striker member.

6. The apparatus of claim 1 wherein said striker member includes an elongated body terminating in a striker head at one end thereof and an actuator handle at an opposing second end thereof.

7. The apparatus of claim 1 wherein said mechanism for moving said slide apparatus can be selectively manipulated to vertically move said slide block in said slide tube, said slide apparatus being held stationary while said mechanism for pivoting said striker member is operated to obtain a reverberation when said striker member strikes said adjacent portion of said metal panels.

8. The apparatus of claim 1 wherein said bulk feed tank further includes a vertically oriented ladder, said slide tube being mounted to said ladder for support thereof from said bulk feed tank.

9. An apparatus for striking an exterior side of a bulk feed tank, said bulk feed tank including a hollow body defining a storage compartment and being formed from metal panels oriented into a vertical structure defining said exterior side, comprising:
   a slide tube supported in a generally vertical orientation along said exterior side of said bulk feed tank, said slide tube having a vertical slot formed therein;
   a slide block having a first portion slidably received within said slide tube for vertical movement therein and a second portion projecting from said first portion through said slot;
   a striker member pivotally connected to said second portion and being selectively pivotally movable to strike an adjacent portion of said exterior side to create a reverberation sound; and
   an actuator mechanism for selectively moving said slide apparatus relative to said slide tube and for selectively pivoting said striker member.

10. The apparatus of claim 9 wherein said slide block has slide panels mounted thereon to facilitate movement of said slide block within said slide tube.

11. The apparatus of claim 10 wherein said actuator mechanism includes a rope secured to a top portion of said slide block and extending upwardly therefrom through said slide tube to be entrained around a pulley mounted at the top of said slide tube, said rope extending downwardly from said pulley to a position near a bottom portion of said slide tube, and then extending upwardly to connect to said striker member.

12. The apparatus of claim 11 wherein said rope can be manipulated to position said striker member at a desired location along said exterior side of said bulk feed tank by pulling on a first upward run of said rope extending downwardly from said pulley, said rope being operable to pivot said striker member by manipulating a second upward run of said rope extending downwardly from said striker member.

13. The apparatus of claim 12 wherein said second portion of said slide apparatus is a flange connected to said slide block and extending outwardly from slide tube through said slot therein, said flange including a mounting portion to carry a pivot for connection to said striker member.

14. The apparatus of claim 12 wherein said striker member includes an elongated body terminating in a striker head at one end thereof and an actuator handle at an opposing second end thereof.

15. The apparatus of claim 12 wherein after said rope is selectively manipulated to vertically move said slide block in said slide tube to a desired location, said slide apparatus is held stationary while said rope is manipulated to pivot said striker member to obtain a reverberation when said striker member strikes said exterior side.

16. The apparatus of claim 12 wherein said bulk feed tank further includes a vertically oriented ladder, said slide tube being mounted to said ladder for support thereof from said bulk feed tank.

17. A method of estimating an empty volume in a bulk feed tank above a level of feed contained within said bulk feed tank, comprising the steps of:
   providing an apparatus for striking an exterior vertical side of said bulk feed tank, said apparatus including a vertically oriented slide tube having a slide block movably mounted therein and a striker member supported on said slide block, said striker member being selectively positionable along said exterior vertical side;
   positioning said striker member at a first selected location along said exterior vertical side by sliding said slide block within said slide tube;
   causing said striker member to pivot relative to said slide block to cause said striker member to strike said exterior vertical side at said first selected location to obtain a first reverberation from said exterior vertical side;
   re-positioning said striker member to another selected location along said exterior vertical side;

causing said striker member to pivot at said second selected location to strike said exterior vertical side to obtain another reverberation from said exterior vertical side;

repeating said re-positioning step and said causing step until the level of feed within said bulk feed tank is estimated from the changes in sequential said reverberations; and evaluating the volume of the bulk feed tank above said level of feed to estimate the empty volume of said bulk feed tank.

18. The method of claim 17 wherein said another selected position at said re-positioning step is located above or below said positioning step as a function of the pitch of said reverberation obtained from the preceding said causing step.

19. The method of claim 18 wherein said apparatus further includes a rope secured to a top portion of said slide block and extending upwardly therefrom through said slide tube to be entrained around a pulley mounted at the top of said slide tube, said rope extending downwardly from said pulley outside of said slide tube to a position near a bottom portion of said slide tube, and then extending upwardly to connect to said striker member, said causing steps being accomplished by pulling on an upward run of said rope extending downwardly from said striker member.

20. The method of claim 19 wherein said positioning and re-positioning steps can be accomplished by manipulating said rope to position said striker member by pulling on an upward run of said rope extending downwardly from said pulley.

* * * * *